US006842779B1

(12) United States Patent
Nishizawa

(10) Patent No.: US 6,842,779 B1
(45) Date of Patent: Jan. 11, 2005

(54) AGENT ACCESSORY TOOL COOPERATING WITH INTEGRATED APPLICATION ON WEB SERVER BY HTTP PROTOCOL

(76) Inventor: Yasuo Nishizawa, 10-5 Kitanodai 5-chome, Hachioji-shi Tokyo (JP), 192-0913

(*) Notice: Subject to any disclaimer, the term of this patent is extended or adjusted under 35 U.S.C. 154(b) by 0 days.

(21) Appl. No.: 09/423,317

(22) PCT Filed: Mar. 11, 1998

(86) PCT No.: PCT/JP98/01012

§ 371 (c)(1),
(2), (4) Date: Nov. 12, 1999

(87) PCT Pub. No.: WO99/46697

PCT Pub. Date: Sep. 16, 1999

(51) Int. Cl.[7] ............................................. G06F 15/16
(52) U.S. Cl. ........................ 709/220; 709/205; 345/757
(58) Field of Search ................................. 709/217, 202, 709/219, 203, 248, 208, 224, 205, 225, 213, 200, 228; 707/3, 104, 10; 379/88.17; 345/349, 838, 738, 473, 757; 713/201; 701/33; 386/95

(56) References Cited

U.S. PATENT DOCUMENTS

| 5,721,908 A | * | 2/1998 | Lagarde et al. ................. 707/10 |
| 5,802,296 A | * | 9/1998 | Morse et al. .................. 709/208 |
| 5,880,731 A | * | 3/1999 | Liles et al. ................... 345/349 |
| 5,884,029 A | * | 3/1999 | Brush, II et al. ............ 709/202 |

(List continued on next page.)

OTHER PUBLICATIONS

Bickmore et al, Animated Autonomous Personal Representatives, IEEE 1998.*
CHI 97: Advance PRogram. www.acm.org/sigchi/chi97ap/tuts.html.*

(List continued on next page.)

*Primary Examiner*—Thong Vu
(74) *Attorney, Agent, or Firm*—Jacobson Holman PLLC

(57) ABSTRACT

An agent accessory tool which enables integration of a Web-type application operating within a browser area and general application operating outside browser area is provided. The agent accessory tool includes an agent program interlocking by HTTP incorporated in a personal computer (hereinafter referred to as PC) of each of a plurality of clients, and a Web server having a CGI interface for executing communication software and an external application of the HTTP concerned to each client PC through a communication line. In this agent accessory tool interlocking with the integrated application on the Web server by the HTTP, the agent program accesses various data of a CGI program through the Web server under input conditions, and music and images to each client. When, as a result, the data are updated from previous access data or in conformity to predetermined conditions, an accessory tool including an avatar (digital actor) is caused to appear on the display of the PC of the client, and is also caused to conduct a predetermined action/reaction so as to transmit the existence of information, the non-conformity to the predetermined conditions, and music and images to each client. As a result, the agent accessory tool operates integrally with the Web application by accessing the Web server, without booting the browser software.

31 Claims, 2 Drawing Sheets

U.S. PATENT DOCUMENTS

| | | | | | |
|---|---|---|---|---|---|
| 5,987,525 | A | * | 11/1999 | Roberts et al. | 709/248 |
| 6,006,260 | A | * | 12/1999 | Barrick, Jr. et al. | 709/224 |
| 6,018,801 | A | * | 1/2000 | Palage et al. | 713/201 |
| 6,021,433 | A | * | 2/2000 | Payne et al. | 709/219 |
| 6,026,433 | A | * | 2/2000 | D'Arlach et al. | 709/217 |
| 6,026,435 | A | * | 2/2000 | Enomoto et al. | 709/217 |
| 6,029,175 | A | * | 2/2000 | Chow et al. | 707/104 |
| 6,078,928 | A | * | 6/2000 | Schnase et al. | 707/104 |
| 6,125,385 | A | * | 9/2000 | Wies et al. | 709/203 |
| 6,167,253 | A | * | 12/2000 | Farris et al. | 455/412 |
| 6,202,060 | B1 | * | 3/2001 | Tran | 707/3 |
| 6,233,318 | B1 | * | 5/2001 | Picard et al. | 379/88.17 |
| 6,253,234 | B1 | * | 6/2001 | Hunt et al. | 709/213 |
| 6,285,380 | B1 | * | 9/2001 | Perlin et al. | 345/473 |
| 6,295,551 | B1 | * | 9/2001 | Roberts et al. | 709/205 |
| 6,329,994 | B1 | * | 12/2001 | Gever et al. | 345/473 |
| 6,405,111 | B2 | * | 6/2002 | Rogers et al. | 701/33 |
| 6,424,968 | B1 | * | 7/2002 | Broster et al. | 707/3 |
| 6,456,307 | B1 | * | 9/2002 | Bates et al. | 345/838 |
| 6,476,827 | B1 | * | 11/2002 | Porter | 345/738 |
| 6,577,328 | B2 | * | 6/2003 | Matsuda et al. | 345/757 |
| 6,580,870 | B1 | * | 6/2003 | Kanazawa et al. | 386/95 |
| 6,587,880 | B1 | * | 7/2003 | Saigo et al. | 709/225 |
| 6,591,295 | B1 | * | 7/2003 | Diamond et al. | 709/217 |

OTHER PUBLICATIONS

Ciancarini et al, PageSpace: An Architecture to Coordinate Distributed Application on the Web, www5conf.inria.fr/fich_html/papers/P5/Overview.html.*

Output–Sensitive Rendering and Communication in Dynamic . . . —Sudarsky, Gotsman (1997);www.cs.technion.ac.il/~gotsman/AmendedPubl/Output–SensitiveRender/Output–SensitiveRender.pdf.*

Virtual Society: Collaboration in 3D spaces on the Internet.; www.csl.sony.co.jp/person/rodger/CSCW/cscw.html.*

Multi–agent task allocation; www.cis.upenn.edu/~badler/vhpaper/vhlong/node9.html.*

Vrml archive for May 1997: ROOMS—a new proposal ; www.web3d.org/www-vrml/hypermail/1997/9705/0640.html.*

Living Worlds—Concepts Doc ; www.web3d.org/Working-Groups/living–world . . . _2/lw_ideas.htm.*

Kihara et al., "Multimedia Communication WWW Server and Database", Nikkei Communication Aug. 5, 1996 No. 227, Nikkei Business Publications, Inc., pp. 136–137, Fig. 1.

JP, 09–097263, A (NEC Corp.),—Apr. 8, 1997, p. 6, Par. Nos. [0052] to [0055].

Sugawara, "Cyberspace Fujitsu Habitat II", FUJITSU May 31, 1996, vol. 47, No. 3, pp. 240–246, Fig. 2.

Study on Personified Agent is Progressing Toward the Application Nov. 27, 1995, Nikkei Business Publications, Inc., pp. 124–126, Figs. 1, 3, 4.

Special Article PUSH Technique Solving the WWW information Flood, Nikkei Computer, Mar. 31, 1997, Nikkei Business Publications, Inc., pp. 216–229, p. 220 right column to p. 222 right column.

Mohri et al., "Personal WWW Server Corresponding to Agent", Research Report of Information Processing Society of Japan, vol. 97, No. 54 (MBL–1) May 30, 1997, pp. 13–18, Fig. 1.

"Remote Access", Nikkei Communication Dec. 16, 1996, No. 236, Nikkei Business Publications, Inc., pp. 128–129, Fig. 1.

* cited by examiner

AGENT ACCESSORY TOOL COOPERATING WITH INTEGRATED APPLICATION ON WEB SERVER BY HTTP PROTOCOL

The Agent Accessory tool cooperating with integrated applications on WEB server through HTTP Protocol

TECHNICAL FIELD

This invention concerns improvement of a system using the Agent Programs embedded in a client's PC Personal Computer) which is connected with WEB (World Wide Web) servers through Internet or Intranet.

BACKGROUND OF ART

HTTP is the abbreviation of HyperText Transport Protocol which is a telecommunication protocol popularly used for accesses to WEB site. WWW (World Wide Web) servers are composed to be able to activate HTTP programs, and handle data after WEB pages in the WEB servers get accesses from each client.

HTTP is a software program which usually waits for accesses at the WEB server, and manages communication transactions between the server and the clients. Then if the HTTP gets accesses from client side, it enables users to look HyperText in WEB browser on the client's PC.

CGI (Common Gateway Interface) is a common interface to execute exterior applications called CGI programs executed on WEB servers.

Avatar is a "Digital Actor" or Agent appearing in web pages of network spaces such as 3D chat-rooms or VRML (Virtual Reality Modeling Language), and is used as an agent of participants in such hyper spaces.

In such environment, the crawler software is popular among existing WWW browser software embedded in WEB browser of clients' PCs. This software automatically accesses to homepages designated by clients beforehand and automatically retrieves the data into the clients.

Another agent programs are also well known; one automatically searches requested WEB pages at the scheduled time and executes some specific job; and another automatically gathers information scattering in internet and packages them into databases.

The other system is also developed which makes both clients' agents appear on both each client's PC through Communication Chat Server. But these clients' agents can not move and communicate in cyber spaces of the WEB server until they receive clients' orders and instructions, so that these clients' agents are left just as 'dumb doll' when clients give them no instruction, while the clients are apart from the desk, for example.

And also, there are many access tools for Email, but all of them use SMTP Protocol (Email Transferring Protocol) or POP server (Email recipient server).

Real Audio, Netshow are well known for WEB audio applications, and Real Video is well known for WEB motion pictures. But all these software work on WEB Browser and can not function in the manner that the agent follows HTTP protocol on the desktop outside the browser and automatically downloads tunes or pictures from WEB server, and automatically explains these tunes and pictures.

However, none of above mentioned client agent systems is composed to be able to cooperate with WEB server applications, although there are many accessory tools alike icon on clients' PCs which co-work with desktop applications and show music and picture or report internet situation periodically to clients.

Though there is an accessory tool working with HTTP protocol, no client agent system can interactively and organically work with WEB server applications.

Existing agent programs move both inside and outside browsers, but not work with WEB server applications. These existing agent systems have no function periodically checking WEB applications, observing and reporting its situation to clients.

Existing systems to enable communication among several clients through communication chat servers enable communication by letters, audio, and others. But these systems do not interactively or cooperatively work with WEB server applications or their data.

Considering this situation, this invention solves the defect of these agent systems of existing technology, and purposes to provide an agent accessory tool which enables both WEB applications executing in WEB browser domain and general applications running outside the WEB browser domain to work organically, interactively and closely together.

This system also purposes to provide an agent accessory tool which can automatically pick music or pictures from the WEB server by HTTP instructions whether or not browser software is working.

DISCLOSURE OF INVENTION

That is, this invention consists of an agent program working with HTTP protocol embedded in client's PC and WEB server which includes HTTP communication software connected with each client's PC and CGI interface to execute external application. This agent program accesses to data of CGI programs through WEB server under input conditions or at a designed time of each client, and activates the accessory tool like Digital Avatar on client's PC display, and makes the accessory play or show some actions or display some message in order to tell the client new data, information or any message from the WEB application. This invention consists of such an agent program working with integrated application on WEB server through HTTP protocol.

The second invention is characterized by the above mentioned agent program which is always accessible to the WEB server through HTTP communication program even while each client does not open internet browser.

The third invention is characterized by the agent program which is accessible to CGI program such as word-processors, presentation software, database software, communication forms, group ware, audio-servers, general applications, mail-data, schedule management data, message-boards and spread-sheets.

The fourth invention is the agent program and agent accessory tool which can function as "Internet (Intranet) WEB stereo" or "Internet (Intranet) WEB TV" which can pick music and/or pictures from WEB server by HTTP protocol communication method, and broadcast it to clients without booting WEB browser, although this internet broadcast was possible only on browser before in case the audio video server is CGI program.

The fifth invention is the agent accessory tool composed to be able to securely restrict accesses to the CGI program by passwords and Client ID or Group ID issued or allotted to each client or group.

The sixth invention is the agent accessory tool composed to be able to produce a copy of the accessory or avatar (digital actor), and allow the copy of the avatar or accessory to be included in designated client's PC agent program through WEB server, and show the copy on the display of the client's PC.

THE BEST MODE CARRYING OUT THE INVENTION

The following is the explanation and working example on this invention.

Figure 1:
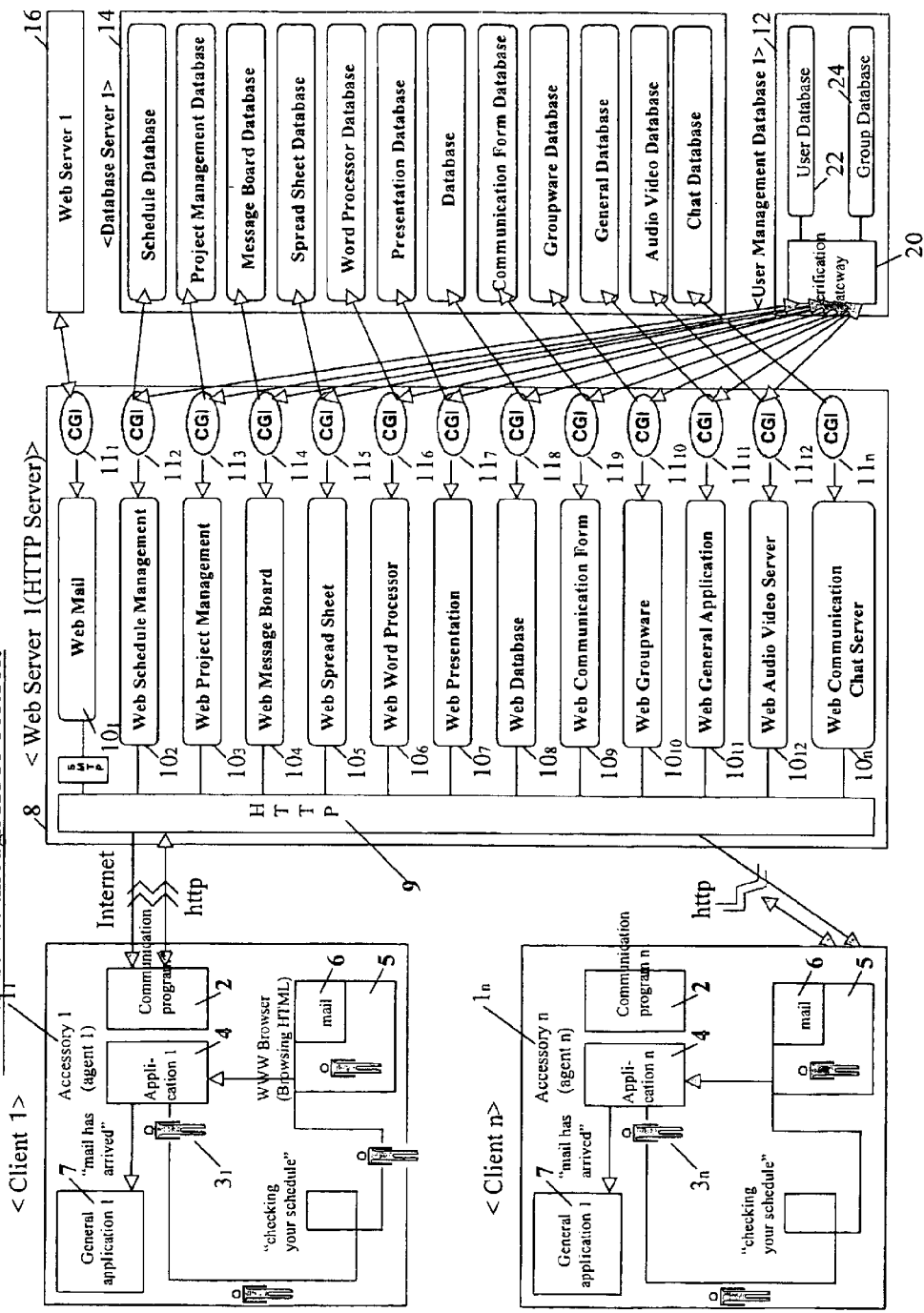
FIG. 1: Rough Block Chart regarding the system of this invention

FIG. 1 is the outline chart concerning this invention. $1_1$-$1_n$ is each client's Personal Computer (called herewith PC). Each PC1 includes http communication program 2, the agent program 4 which displays the avatar (Digital actor) 3 on the display and communicates with client by voice or image in accordance with a defined rule, and WWW browser soft 5, Mail soft 6, and general application program 7.

Each Client's PC is connected with WEB server 8 through public telephone line, special line etc. The WEB server 8 include the http communication program 9 and several application input/output format $10_1$-$10_n$ written in HTML language. These applications are such as "WEB Mail", "WEB Scheduler", "WEB Spread Sheet", "WEB Word processor", "WEB Presentation", "WEB Communication Form", "WEB Groupware", "WEB type general application", "WEB Audio/Video Server", and "Agent Communication Chat Server".

Each application input/output format $10_1$-$10_n$ is connected with the Client Administrative Database server 12 and Database server 14 and Mail server 16 through CGI (Common Gateway Interface) $11_1$-$11_n$.

The Agent Program 4 embedded in each client $PCl_i$ is composed to be able to define, by client manual input work, the interval time (how many/every minute) to go and check the WEB application such as the Mail server 16, and also the interval time (how many/every hour) to go and check the WEB scheduled program. It is also composed to be able to define the agent's behavior and the way to inform the client in corresponding with several event occurred at WEB application, and define how the agent reacts on the content of the message. Therefore, the agent program can automatically and regularly check the WEB application and automatically inform the client of events at the WEB application and behave in accordance with the instruction from the WEB server.

Each Agent Program 4 has a function to enable client' $PC1_i$ to send and receive the copy 3' of the avatar 3 through the WEB mail server, and display the copy 3' of the mail sender on the receivers $PC1_j$.

Each agent program closely, deeply and profoundly cooperates with other WEB applications on WEB server and shows some message or behaves in accordance with a rule defined in the agent program.

The Client Administrative Database 12 is made for management and verification of the access right to the Database server 14. This Database 12 judges the access right of each client to each requested application program of the Database Server 14 by collating with the Client ID data 22 and Group ID data 24 included in the database and the Verification Gateway 20 connected through the CGI 11 and informs the WEB server of its judgement. As the result of this work, the access to the application program is rejected if the client is not verified.

Figure 2:
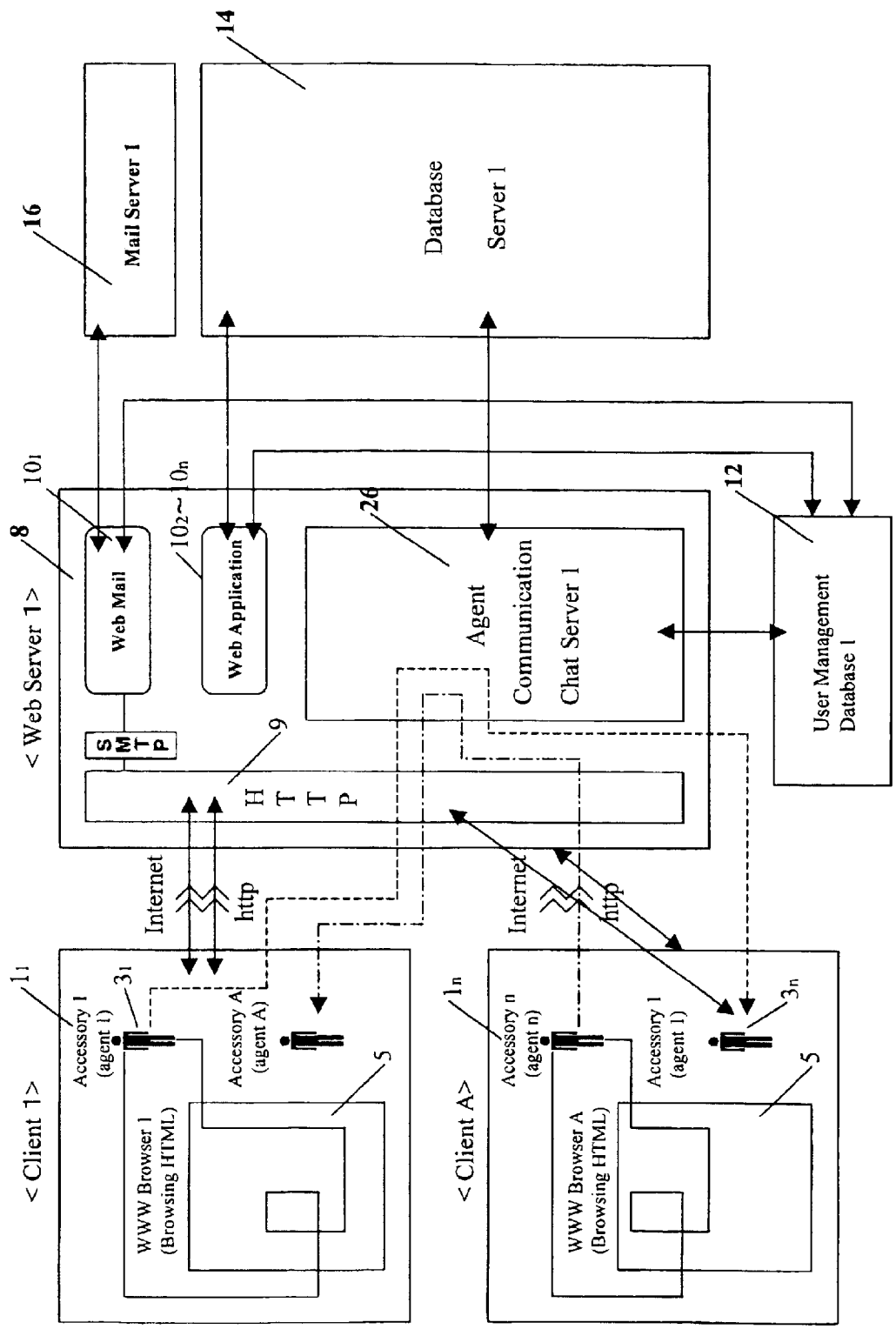
FIG. 2: Block Chart explaining the move of the avatar as the agent of this invention

The FIG. 2 shows the outline of the Chat server for agent communication. The Web server 8 and each client PC1 are connected with Internet or Intranet through HTTP protocol. WEB Mail $10_1$ on WEB server 8 and WEB application $10_2$-$10_n$ and Agent Communication Chat Server 26 are composed to be able to work together. For example, when the client sends its copy of avatar 3 (Digital Actor) to some other client $PC_n$ with its mail through WEB mail, the Mail Server stores the Client $1_i$'s message, and the copy 3 of the avatar $3_1$ (Digital Actor) is stored in the Chat Database in the Database Server 14.

Then, when the client in runs the agent program 4 and accesses to the WEB server 8 to check Web mail, the sender's avatar $3_i$ (Digital Actor) with new mail is stored in the Agent application program 4 through HTTP communication program 2. And the Avatar (Digital Actor) 3, appears on the receiver's display and informs the client of mail arrival by the agent program 4 stored in the client $PC1_n$ whether or not the client runs browser soft 5. When the client run the Mail soft 6 or Browser soft 5 to check the new mail, the avatar 3, (Digital Actor) disappears from the display.

Furthermore, in this invention of the system, the agent software can activate together with instruction of application software in the WEB server because ordinary popular application softwares (word-processor, mailer software, database software) are not installed in the client's PC and each application softwares are made in the form of HTML format such as CGI programs for WEB type.

The Agent Program 4 includes not only Audio Chat software but also Player Software such as Real Audio Player or Real Video Player. As far as the client's $PC1_i$ is connected with Web server 8, the Agent Program can emit music or video without running browser software 5, just by accessing to the audio or video database in the WEB server 8 through HTTP communication program 2. Besides, the Agent Program can automatically and regularly go to check WEB server and broadcast music and motion picture in accordance with set-up of the Agent Program.

Though above execution example just refers the case in which each client is always connected with Internet or Intranet, this invention is not limited to such case. It is needless to say, in case of Internet, the communication program of the Agent Program can be programmed a dialer which can work with TCP/IP and composed to automatically dial up and access to the WEB server 8 at regular intervals.

INDUSTRIAL APPLICABILITY

As mentioned above, although existing Agent Programs mutually communicate with WEB server only when mail software or browser software are activated, this agent accessory program of this invention automatically accesses to WEB server by HTTP protocol, and cooperates with several WEB application software, and informs each client of event or instruction of the application program, and informs arrivals of mails or schedule or any other message from WEB server by the accessory emitting voices, sounds or some signal, moving on the screen. That is why client can easily promptly and automatically know message from WEB application such as mail arrival or schedule confirmation or any other messages from WEB application.

Though, in the case of existing Agent Programs, clients could not know the situation or instruction of WEB server application until they activate browser software and request to the WEB server, this invention makes it possible to tell clients any message or any instruction from WEB application on WEB server without opening or activating browser, because of the reaction and behavior of the agent HTTP protocol.

Besides, in this invention, avatars (Copy of Digital actor) can be sent from mail senders to receivers, and can move on the receivers' PC displays. Thus communication between both clients become more close and friendly.

Furthermore, in this invention, it is possible to activate several application programs on WEB server through CGI interface, and input data or word processor command or data command in designated formats by confirming rule or response on each client's display, and printout using clients' printers, and store data in the database on WEB server. Therefore, each client can use applications or data of WEB servers without storing such application programs or database programs in each client's PC. This can make memory size of each clients' PC or quantity of operation software embedded in each client terminal reduce.

What is claimed is:

1. An agent accessory tool communicating through HTTP with web server-integrated applications to keep a client informed of changes in said applications, comprising:

an agent program embedded in a client computer and using HTTP, said client computer having at least one general application stored therein;

a web server having HTTP communication software connected to said client computer and a common gateway interface to execute an external web application;

said agent program accessing data of a CGI program through said web server and interlocking with said external web application according to a rule defined in said agent program so that said agent program regularly and automatically accesses external web application data through said common gateway interface using HTTP and, in response to a change in said external web application, self-activating a display function on said client computer to notify said client of said change without browser software activation, said display function including a plurality of display formats defined by said embedded agent program according to data type, at least one of said display formats being produced by said general application in response to activation thereof by said agent program.

2. The agent accessory tool as set forth in claim 1, wherein said agent program is always accessible to said web server through said HTTP communication software independent of activation of any browser software on said client computer.

3. The agent accessory tool as set forth in claim 1, wherein an interval time at which said agent program repeatedly accesses said external web application data for changes is definable by client input.

4. The agent accessory tool as set forth in claim 3, wherein said agent program continues to access said external web application data in accordance with said interval time without activating browser software on said client computer.

5. The agent accessory tool as set forth in claim 1, wherein said external web application includes at least one of a word processor, presentation software, spreadsheet software and database software.

6. The agent accessory tool as set forth in claim 1, wherein said external web application includes at least one of communication forms, groupware, an audio server and schedule management data.

7. The agent accessory tool as set forth in claim 1, wherein said external web application includes at least one of mail data and message boards.

8. The agent accessory tool as set forth in claim 1, further comprising a password to securely restrict access to said external web application through said common gateway interface.

9. The agent accessory tool as set forth in claim 1, wherein said external web application includes an audio server and said agent program activates an audio player general application stored on said client computer to broadcast audio from said server to said client computer without browser activation.

10. The agent accessory tool as set forth in claim 1, wherein said external web application includes a video server and said agent program activates a video player general application stored on said client computer to broadcast video from said server to said client computer without browser activation.

11. The agent accessory tool as set forth in claim 1, wherein said display formats include presentation of a text message, presentation of a video message, movement of a corresponding avatar, and generation of a sound.

12. The agent accessory tool as set forth in claim 1, wherein said client computer includes a plurality of general applications stored thereon and running on a desktop area outside a browser area in said client computer, said agent program activating said plurality of general applications which work organically, interactively and closely together with the external web application on the server through functioning of said agent accessory tool.

13. The agent accessory tool as set forth in claim 1 wherein said client computer includes a plurality of general applications stored thereon and running on a desktop area outside a browser area in said client computer, said agent program operating said plurality of general applications in accordance with input received from the external web application on the web server.

14. The agent accessory tool as set forth in claim 13, wherein said agent program functions to send to the external web application, on a periodic or regularly scheduled basis, a result from the operating of at least one of said general applications in response to a message, command or data input by said client.

15. The agent accessory tool as set forth in claim 1, wherein each of said client personal computers includes a memory for storing general application programs and data from said external web application, storage of said data allowing a user continuing access to said data when said client personal computer is not in communication with said web server.

16. An agent accessory tool communicating through HTTP with a web server to monitor a status of a web-integrated application, comprising:

a web server having HTTP communication software and a common gateway interface to execute an external web application;

a client computer connected to said web server and having at least one general application stored thereon; and an agent program embedded in said client computer and using HTTP to regularly and automatically access a status of said external web application through said common gateway interface with no browser software activation, said agent program, upon detecting a change in said status, self-activating a display function on the client computer to notify a user of said client computer of the change without browser software activation, said display function including a plurality of display formats defined by said embedded agent program;

said agent program activating and operating said at least one general application on the client computer to perform said display function.

17. The agent accessory tool as set forth in claim 16, wherein said external web application includes music and/or pictures and said agent program activates an audio and/or video player, respectively, to broadcast said music and/or pictures to said client computer without browser activation.

18. The agent accessory tool as set forth in claim 16, wherein an interval time at which said agent program repeatedly accesses said external web application data is definable by client input.

19. The agent accessory tool as set forth in claim 16, wherein said external web application includes at least one of a word processor, presentation software, spreadsheet software and database software.

20. The agent accessory tool as set forth in claim 16, wherein said external web application includes at least one of communication forms, groupware, an audio server and schedule management data.

21. The agent accessory tool as set forth in claim 16, wherein said external web application includes at least one of mail data and message boards.

22. The agent accessory tool as set forth in claim 16, wherein said client computer includes a plurality of general applications stored thereon and running on a desktop area outside a browser area in said client computer, said agent program activating said plurality of general applications which work organically, interactively and closely together with the external web application on the server through functioning of said agent accessory tool.

23. The agent accessory tool as set forth in claim 16, wherein said client computer includes a plurality of general applications stored thereon and running on a desktop area outside a browser area in said client computer, said agent program operating said plurality of general applications in accordance with input received from the external web application on the web server.

24. The agent accessory tool as set forth in claim 23, wherein said agent program functions to send to the external web application, on a periodic or regularly scheduled basis, a result from the operating of at least one of said general applications in response to a message, command or data input by said client.

25. The agent accessory tool as set forth in claim 15, wherein said general application program has a function enabling a user to input data manually to the memory for storage therein and to transmit said data from the client personal computer to an interlocked web application on the web server.

26. The agent accessory tool as set forth in claim 25, wherein said function of enabling the user to input data is active when the client personal computer is not connected to the web server.

27. The agent accessory tool as set forth in claim 26, wherein, upon connection of said client personal computer to said web server, the stored data is transmitted to the interlocked web application on the web server.

28. The agent accessory tool as set forth in claim 16, wherein each of said client personal computers includes a memory for storing general application programs and data from said external web application, storage of said data allowing a user continuing access to said data when said client personal computer is not in communication with said web server.

29. The agent accessory tool as set forth in claim 28, wherein said general application program has a function enabling a user to input data manually to the memory for storage therein and to transmit said data from the client personal computer to an interlocked web application on the web server.

30. The agent accessory tool as set forth in claim 29, wherein said function of enabling the user to input data is active when the client personal computer is not connected to the web server.

31. The agent accessory tool as set forth in claim 30, wherein, upon connection of said client personal computer to said web server, the stored data is transmitted to the interlocked web application on the web server.

* * * * *